United States Patent

Jacobson et al.

Patent Number: 6,038,690
Date of Patent: Mar. 14, 2000

[54] REMOTE AUTOMATIC DIAGNOSTIC ANALYZER FOR INTEGRATED MAILING MACHINES

[75] Inventors: Gary Jacobson, Norwalk; Wesley Kirschner, Hamden; Michael Ramadei, Trumbull, all of Conn.

[73] Assignee: Pitney Bowes Inc., Stamford, Conn.

[21] Appl. No.: 08/992,764

[22] Filed: Dec. 17, 1997

[51] Int. Cl.[7] ............................ G06F 11/27; G06F 11/30
[52] U.S. Cl. .................................. 714/49; 714/2; 714/26; 364/184
[58] Field of Search ........................... 714/2, 26, 49; 358/401; 364/184; 399/81

[56] References Cited

U.S. PATENT DOCUMENTS

| | | | |
|---|---|---|---|
| 4,477,901 | 10/1984 | Barband et al. | 714/46 |
| 4,644,541 | 2/1987 | Linkowski | 714/49 |
| 4,967,337 | 10/1990 | English et al. | 364/84 |
| 5,038,319 | 8/1991 | Carter et al. | 714/6 |
| 5,245,368 | 9/1993 | Farrell et al. | 358/401 |
| 5,412,779 | 5/1995 | Motoyama | 395/275 |
| 5,490,089 | 2/1996 | Smith et al. | 399/81 |
| 5,517,282 | 5/1996 | Yamashita et al. | 355/202 |
| 5,537,554 | 7/1996 | Motoyama | 395/280 |
| 5,544,289 | 8/1996 | Motoyama | 395/280 |
| 5,568,618 | 10/1996 | Motoyama | 395/280 |
| 5,649,120 | 7/1997 | Motoyama | 395/280 |
| 5,680,541 | 10/1997 | Kurosu et al. | 714/26 |

*Primary Examiner*—Meng-Ai T. An
*Assistant Examiner*—Walter Benson
*Attorney, Agent, or Firm*—Ronald Reichman; Michael E. Melton

[57] ABSTRACT

This invention utilizes several coordinating devices that together provide a more comprehensive set of diagnostics which support both on-site and remote diagnostics of the customers equipment. Sensor transitions and profile state execution information will be cross-referenced by a common time stamp. Thus, it will be possible to not only observe the response (sensor transition) to stimulus (motion profiles), but also cross-reference this data to the specific controlling profile state segment. This yields an additional "context" for specific types of errors. The foregoing level of diagnostics will be available on-site with the customers machine for manual processing by a skilled human, when necessary.

6 Claims, 7 Drawing Sheets

6,038,690

REMOTE AUTOMATIC DIAGNOSTIC ANALYZER FOR INTEGRATED MAILING MACHINES

FIELD OF THE INVENTION

The invention relates generally to the field of monitoring systems and more particularly to remote diagnostic systems for the servicing of equipment.

BACKGROUND OF THE INVENTION

In order for machines and equipment to remain operational, the machines and equipment must be repaired and maintained by people. As the complexity of the equipment increases, the amount of knowledge someone must have to maintain and repair the equipment increases. Equipment is repaired because it is more economical to repair the equipment than to throw it away.

Some machines and equipment currently in use are complex and expensive to operate. Often, the machines and equipment may store data that indicates specific problems the machine is having, i.e., paper is jamming in the machine. Sometimes the location of the jam is also indicated, i.e., roller 1, roller 2, or roller 3 etc. Some sensor information regarding the condition of the machine is sometimes stored. An understanding of the manner in which the machine operates will be helpful in repairing the machine. Typical repair technicians are unable to use the above stored information in its native form to repair the machine and consequently will spend additional time to repair the machine and/or phone more experienced personnel for help.

In order for machines and equipment to remain operational, the machines and equipment must be repaired and maintained by repair technicians. A disadvantage of the prior art is that maintenance calls are scheduled chronologically, when the need for servicing of a machine or piece of equipment should ideally be determined by how various components of the machine are currently operating.

Another disadvantage of the prior art is that a complete diagnostic analysis of the equipment is not obtained. Since, often only certain operating conditions (forms of stored data) of the equipment are analyzed automatically or by human interpretation.

SUMMARY OF THE INVENTION

This invention overcomes the disadvantages of the prior art by providing a monitoring system that determines the current condition of various components of the machine and equipment without having a representative of the manufacturer physically inspect the customers machines and equipment. Thus, the number of service calls required to repair and maintain the machine would be reduced.

Another advantage of this invention is that it provides a more focused diagnosis of equipment operating problems or potential equipment operating problems. This is accomplished by analyzing equipment information that is stored in different forms, i.e., sensor transition logs, motion profile execution history, equipment jam location, and the cycle in which the jam occurred, etc. By cross referencing information that is stored in separate logs and automatically transferring the information to a group of experts, who are located at a remote location, this invention enables a more specific accurate analysis of the information and obtains the opinion of experts. Ideally, this information is captured in a central knowledge base that it driven from the error log analyzers.

The apparatus of this invention utilizes several coordinating devices that together provide a more comprehensive set of diagnostics which support both on-site and remote diagnostics of the customers equipment. By logging both sensor transitions and profile state execution, the apparatus of this invention is able to diagnose specific stimulated response faults as well as deduce the context of the specific profile state that reports the error. The foregoing leads to a more detailed accurate diagnosis of the customer's equipment.

This invention will internally log or store all sensor transitions and profile state execution history. The above-mentioned information will be cross-referenced by a common time stamp. Thus, it will be possible to not only observe the response (sensor transition) to stimulus (motion profiles), but also cross-reference this data to the specific controlling profile state segment. This yields an additional "context" for specific types of errors. The foregoing level of diagnostics will be available on-site with the customer's machine for manual processing by a skilled human.

A remote access capability is also provided to service diagnostic centers, at the simplest fault level for service call avoidance, Additionally, there is substantial information available for post processing by an automatic sensor fault analyzer.

DETAILED DESCRIPTION OF THE PREFERRED EMBODIMENT

Figure 1:
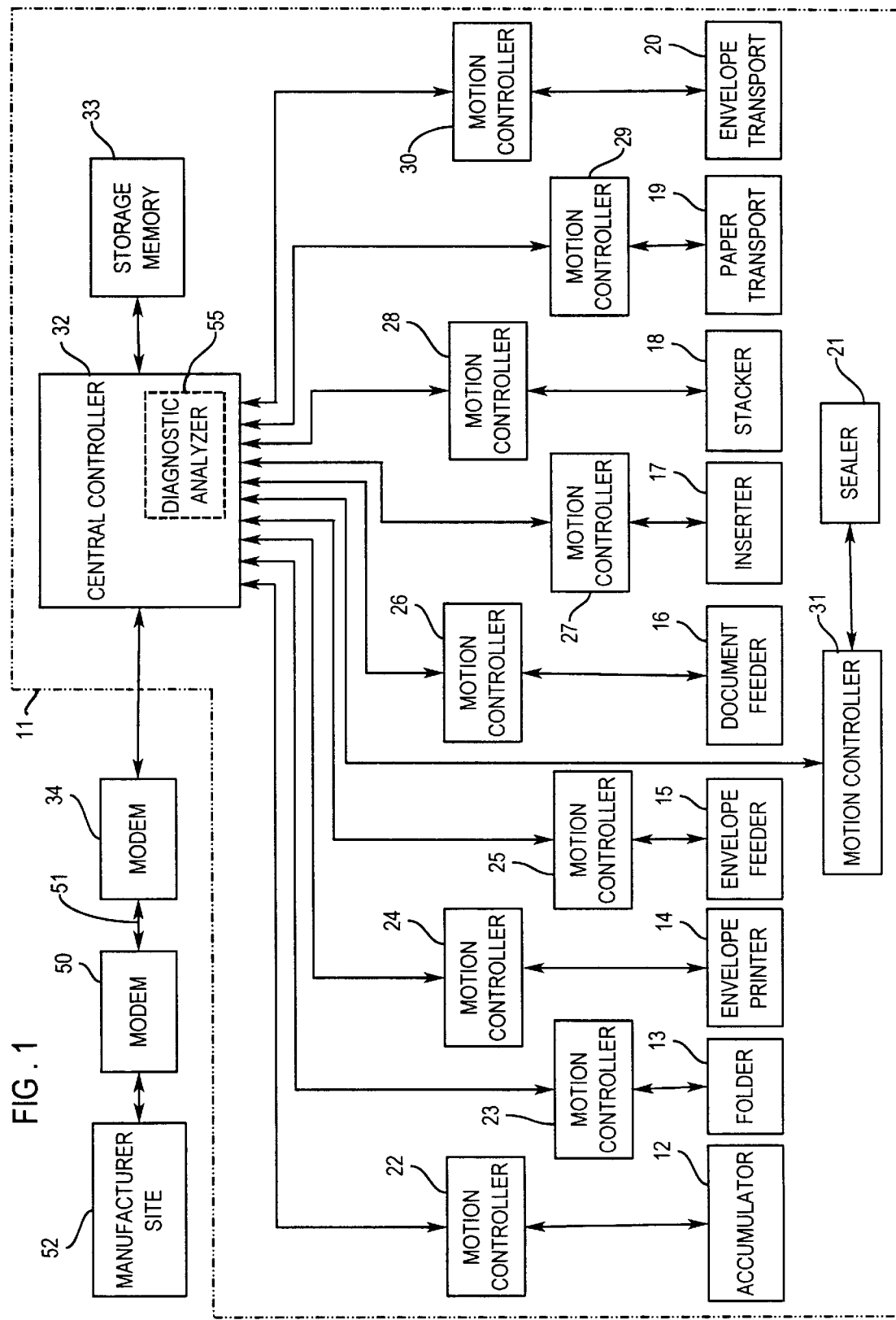
FIG. 1 is a block drawing of a integrated mailing system.

Referring now to the drawings in detail, and more particularly to FIG. 1, there is shown a integrated mailing system 11 on which the present invention may be employed. Mailing system 11 includes: accumulator 12, folder 13, envelope printer 14, envelope feeder 15, document feeder 16, inserter 17, stacker 18, paper transport 19, envelope transport 20, sealer 21, motion controllers 22–31, central controller 32 and storage memory 33. Accumulator 12 is coupled to motion controller 22 and folder 13 is coupled to motion controller 23. Envelope printer 14 is coupled to motion controller 24 and envelope feeder 15 is coupled to motion controller 25. Document feeder 16 is coupled to motion controller 26 and document feeder 16 is coupled to motion controller 26. Inserter 17 is coupled to motion controller 27 and stacker 18 is coupled to motion controller 28. Paper transport 19 is coupled to motion controller 29 and envelope transport 20 is coupled to motion controller 30. Sealer 21 is coupled to motion controller 31. It will be obvious to one skilled in the art that in certain designs accumulator 12, folder 13, inserter 17, paper transport 19 and envelope transport 20 may be controlled by a single motion controller. Motion controllers 22–31 are coupled to central controller 32. Central controller 32 is coupled to data storage device 33. Central controller 32 may be a personal computer having a hard drive and data storage device 33 may be a diskette. Central controller 32 controls mailing system 11 and receives information from controllers 22–31. The information received from motion controllers 22–31 is stored in the hard drive of central controller 32 and on diskette 33. Modem 34 is coupled to central controller 32 and modem 34 is coupled to modem 50 via communications path 51. Modem 50 is coupled to manufacturer's service site 52. A diagnostic analyzer 55 may be a part of central controller 52. Analyzer 55 may be used to process the information received from motion controllers 22–31 to recommend repair action to mailing system 11.

Motion controllers 22–31 are programmed to perform a number of tasks in accordance with a predetermined schedule. The schedule consists of a series of segments consisting of data structures which define elements in the mechanical system to be controlled, identify functions to be performed and include necessary data. Motion controllers 22–31 will provide drive instructions to rollers, sense the paper location of documents, etc. Central controller 32 will store jam logs, sensor transitions, and profile histories of controllers 22–31. The jam log is a record of all paper jams that have occurred in integrated mailing system 11. The jam log states the time, the cycle count and the particular intervals of time that particular sensors did not sense the presence of paper. Sensor transitions are snap shots of each of the sensors at a point in time (what the sensor sensed), i.e., is the leading edge of the paper being detected by sensor 44, etc. The profile history is a log of the commands issued by motion controllers 22–31 i.e., turn motor 40 on at a particular time, turn motor 40 off at a particular time, etc.

The operation and performance of system 11 may be transmitted to manufacturers site 52. This permits system 11 and operator and/or technical repair personnel to communicate with more experienced personnel at manufacturers site 52. The foregoing also permits site 52 to receive information directly from system 11. The profile history and sensor transition information may be used with each other to obtain a clearer understanding of the errors experienced by integrated mailing system 11. For instance, if motor 40 is instructed to be turned on, one does not know whether or not that motor was indeed turned on unless a sensor indicates that particular motor moved.

Figure 2:
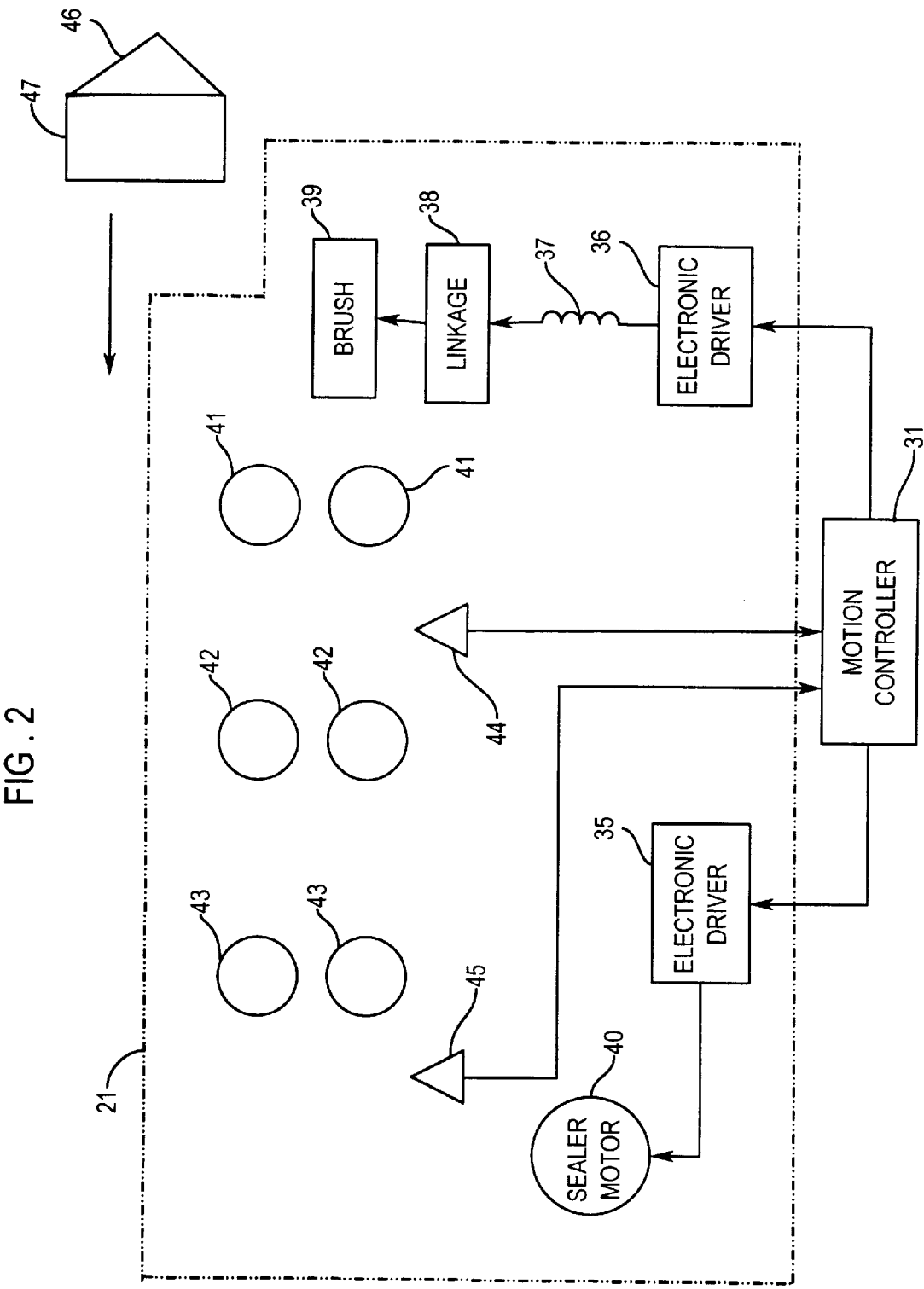
FIG. 2 is a block drawing of sealer 21 of FIG. 1 in greater detail.

FIG. 2 is a block drawing of sealer 21 of FIG. 1 in greater detail. It will be obvious to one skilled in the art that for purposes of this invention, that other components of integrated mailing system 11 function similar to sealer 21. Thus, their detailed description is not necessary. Sealer 21 includes: electronic drivers 35 and 36, solenoid 37, linkage 38, brush 39, sealer motor 40, rollers 41–43, sealer entrance sensor 44 and sealer exit sensor 45. Motion controller 31 is coupled to electronic drivers 35 and 36 and to entrance sensor 44 and exit sensor 45. Electronic driver 35 is coupled to sealer motor 40 and motor 40 is coupled to rollers 41–43 through drive shafts connected with belts and pulleys (not shown). Electronic driver 36 is connected to solenoid 37 and solenoid 37 is connected to linkage 38. Linkage 38 is connected to brush 39. Brush 39 is moved by linkage 38 which is activated by solenoid 37, that is driven by driver 36, which is controlled by motion controller 31. Rollers 41 move flap 46 of envelope 47 over rollers 41 to moisten flap 46. Rollers 42 and 43 are used to transport envelope 47 and close flap 46. Entrance sensor 44 and exit sensor 45 are used to divide the problem into section, i.e., determine the location the problem occurred. As will be explained in more detail as this description proceeds, information from various sources i.e., sensor transition data, profile state execution history and jam logs will be used to determine problems with integrated mailing system 11.

Figure 3:
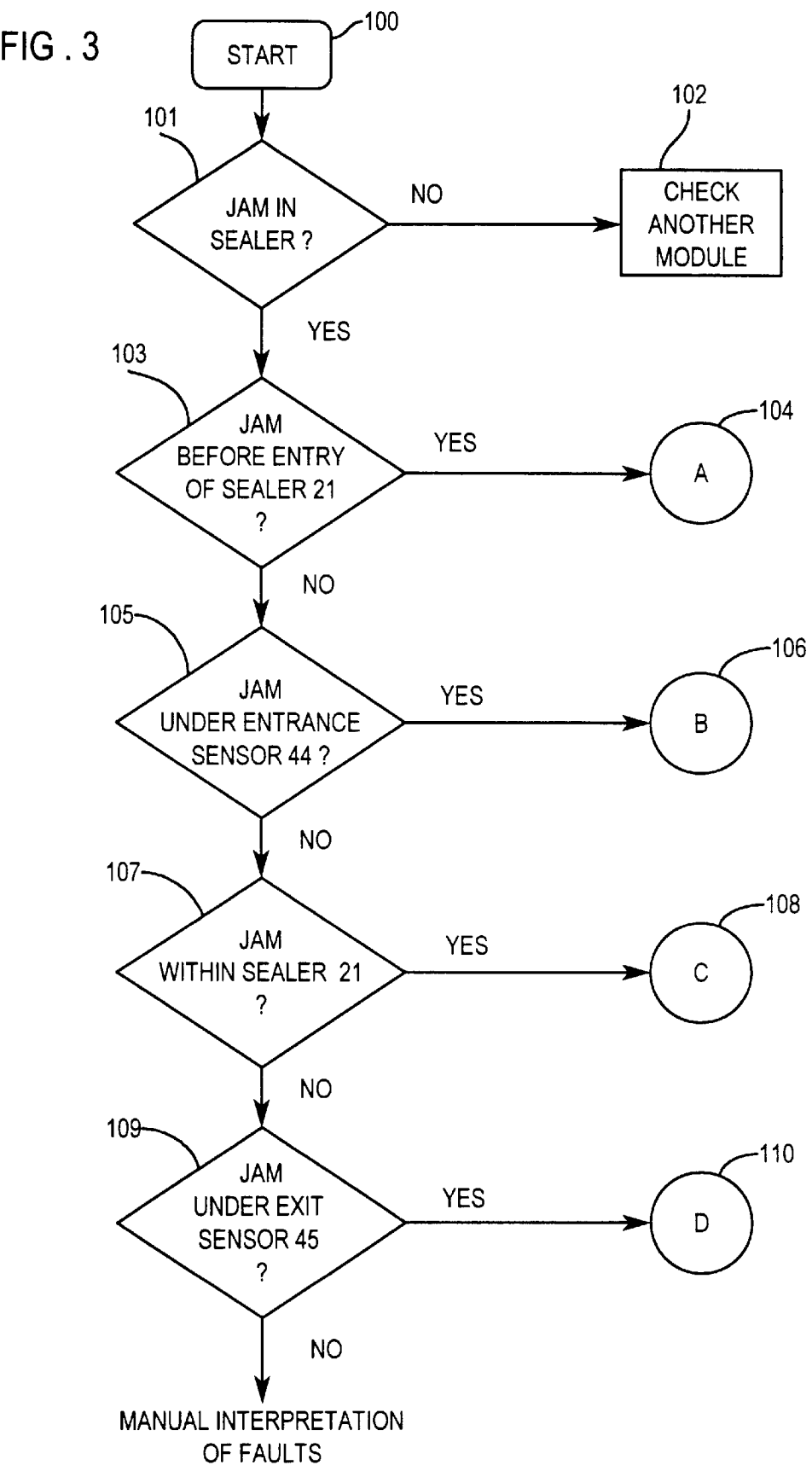
FIG. 3 is a flowchart of a decision tree of a jam in sealer 21 of FIG. 1.

FIG. 3 is a flowchart of a decision tree of a jam in Sealer 21 of FIG. 1. The flowchart begins in Block 100 entitled Start. Then the program moves to Decision Block 101. Decision Block 101 determines whether or not there is a jam in Sealer 21. If Decision Block 101 determines that if there isn't a jam in Sealer 21, then the program goes to Block 102 to check Modules 12, 13, 14, 15, 16, 17, 18, 19, and 20 of FIG. 1. If Block 101 determines there is a jam in Sealer 21, then the program moves to Decision Block 103. Decision Block 103 determines whether or not there was a jam before the entry of Sealer 21, that is, before Rollers 41 and Linkage 38. The Jam History Log will be used to determine the specific pattern of jams. If Decision Block 103 determines there was a jam before the entry of Sealer 21, then the program will move to Block 104 and execute sub-routine A, which is described in the description of FIG. 4. If Decision Block 103 determines there is no jam present before the entry of Sealer 21, then the program will proceed to Decision Block 105. Decision Block 105 will determine whether or not there is a jam under the entry of Entrance Sensor 44. The Jam History Log for specific patterns of jams will be used. If Block 105 determines that there is a jam under Entrance Sensor 44, then the program will proceed to Block 106 to execute sub-routine B. Sub-routine B is described in more detail in the description of FIG. 5. If Block 105 determines that no jam is under Entrance Sensor 44, then the program will move to Decision Block 107. Decision Block 107 will determine whether or not there is a jam within Sealer 21. That is, Decision Block 107 will determine whether or not there is a jam between Entrance Sensor 44 and Exit Sensor 45. The Jam History Log for specific patterns of jams will be used. If Block 107 determines there is a jam within Sealer 21, then in that event the program will proceed to Block 108 to execute sub-routine C, which is described in more detail in the description of FIG. 6. If Block 107 determines that there is no jam within Sealer 21, then the program will go to Decision Block 109. Block 109 determines whether or not there is a jam under Sealer Exit Sensor 45. The Jam History Log for specific pattern of jams will be used. If Block 109 determines that there is a jam under Exit Sensor 45, then the program will proceed to Block 110 to execute sub-routine D. Sub-routine D is described in more detail in the description of FIG. 7. If Block 109 determines that there is no other type of error, then the program will proceed to manual interpretation of faults.

Figure 4:
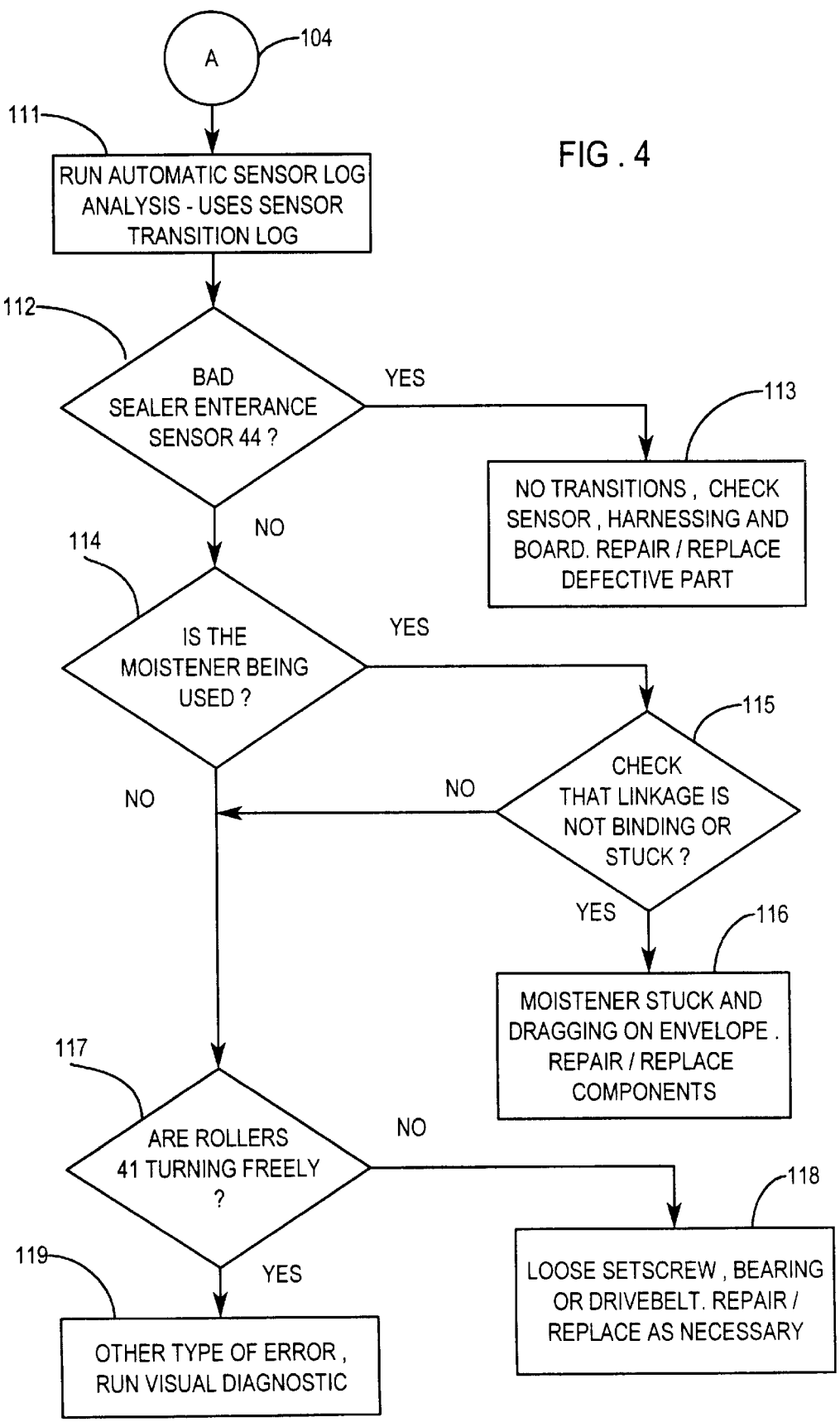
FIG. 4 is a flowchart of jams before the entrance to sealer 21, i.e., sub-routine A.

FIG. 4 is a flowchart of jams before the entrance to Sealer 21. Sub-routine A begins in Block 104 and proceeds to Block 111 to run the automatic sensor log analysis, using the Sensor Transition Log. At this point, the program proceeds to Decision Block 112. Decision Block 112 determines whether or not Sensor 44, the Entrance Sensor, is functioning correctly. The program checks the Sensor Log for lead edge transitions of Entrance Sensor 44. If Block 112 determines that Sensor 44 is operating improperly, then in that event the program proceeds to Block 113. Since a bad sensor is present, that is, no transitions existed, Block 113 will tell the technician to check the Sensor, the harnessing, and the board, and, if necessary, repair and replace the defective part. If Block 112 determines that Sensor 44 is operating properly by finding the lead edge transitions on Entrance Sensor 44, then the program will proceed to Decision Block 114. Decision Block 114 will determine or not the moistener is being used, i.e., Linkage 38 and Brush 39 of FIG. 2. If Brush 39 is being used, then the program will proceed to Decision Block 115. Block 115 will determine whether or not linkage 38 is binding or stuck. This is done by automatically checking the Profile Transition Log to see when Linkage 38 is activated. If Block 115 determines that Brush 39 is stuck and dragging on the envelope, the program proceeds to Block 116 to inform the technician to replace the appropriate components. If Block 115 determines that Linkage 38 is not stuck, then the program proceeds to the No Output of Decision Block 114. If Decision Block determines that Brush 39 is not being used, then the program proceeds to the input of Decision Block 117. Decision Block 117 determines whether or not Rollers 41 are turning freely (this may be a manual observation by the operator). If Decision Block 117 determines that Rollers 41 are not turning freely, then the program proceeds to Block 118 to inform the technician that probable causes include loose set screw, bearing problem, or loose drive belt and to replace the necessary part. If Decision Block 117 determines that Rollers 41 are turning freely, then the program proceeds to Block 119 to run other types of errors and a visual diagnostic.

Figure 5:
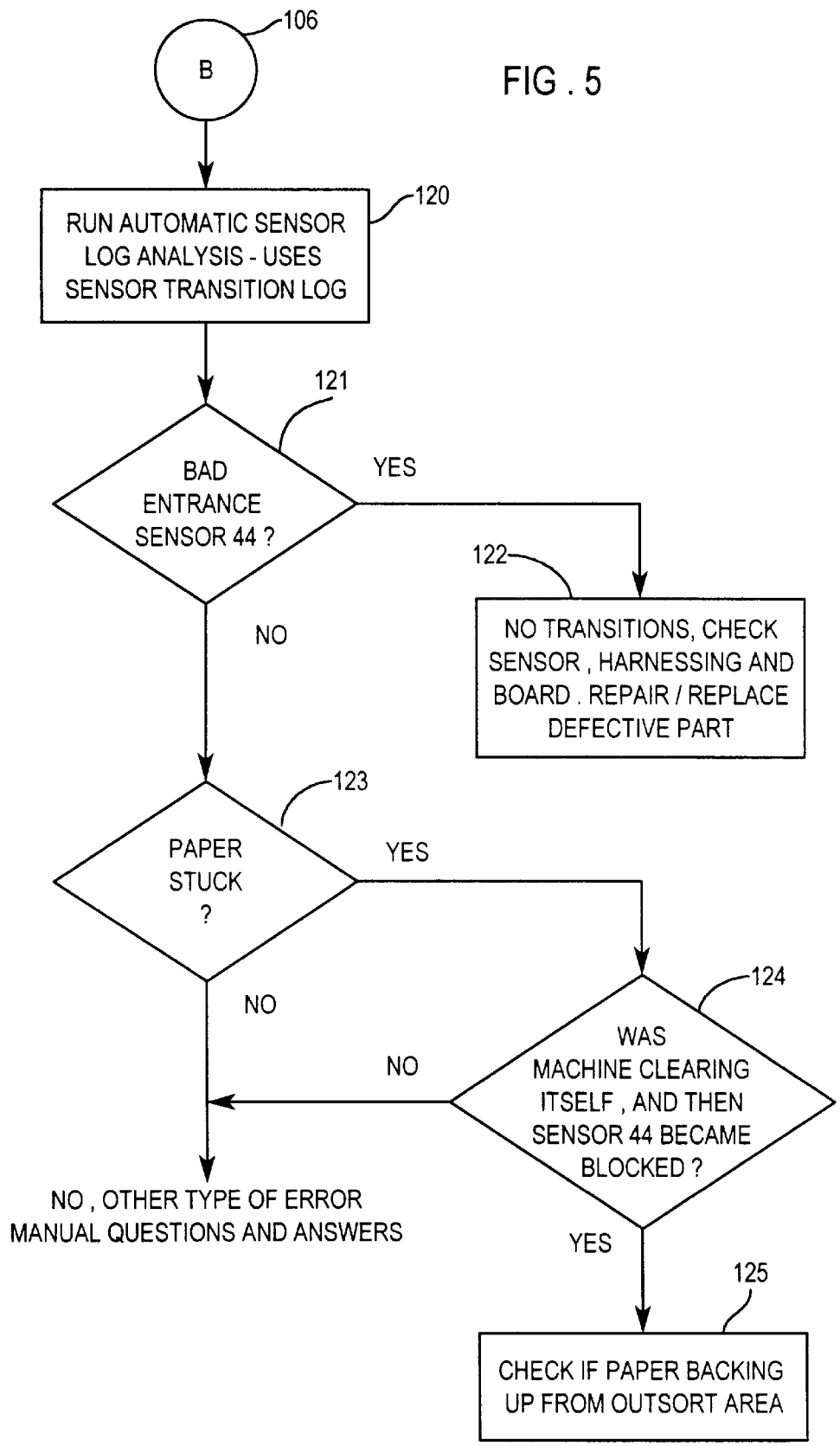
FIG. 5 is a flowchart of jams under entrance sensor 44, i.e., sub-routine B.

FIG. 5 is a flowchart of jams under Entrance Sensor 44. Sub-routine B begins in Block 106 and proceeds to Block 120 to automatically run the Sensor Log Analysis, using the Sensor Transition Log. Then the program proceeds to Decision Block 121 to determine whether or not there is a bad Sealer Entrance Sensor 44. This will be accomplished by checking the Sensor Log for trail edge transitions on Entrance Sensor 44. If Block 121 determines that Sensor 44 is bad, then the program goes to Block 122 to have the technician check sensor 44, the Harnessing Board and, if necessary, replace any defective parts. If Block 121 determines that Sensor 44 is operating properly, the program will proceed to Decision Block 123. The foregoing is determined by looking at the trailing edge transitions of Entrance Sensor 44. Decision Block 123 determines whether or not paper is stuck and the machine has to be cleared. If Block 123 determines that no paper is stuck, then the program proceeds to Decision Block 124. Decision Block 124 determines whether or not the machine was clearing itself and then Sensor 44 became blocked. If the machine was clearing itself and Sensor 44 became blocked, then the program will go to Block 125 to check if paper is backing up from the Outsort area. If Block 124 determines that the machine was not clearing itself before Sensor 44 became blocked, then the program will proceed to the No Output of Decision Block 123. The No Output of Decision Block 123 goes to an other type of error (manual questions and answers)

Figure 6:
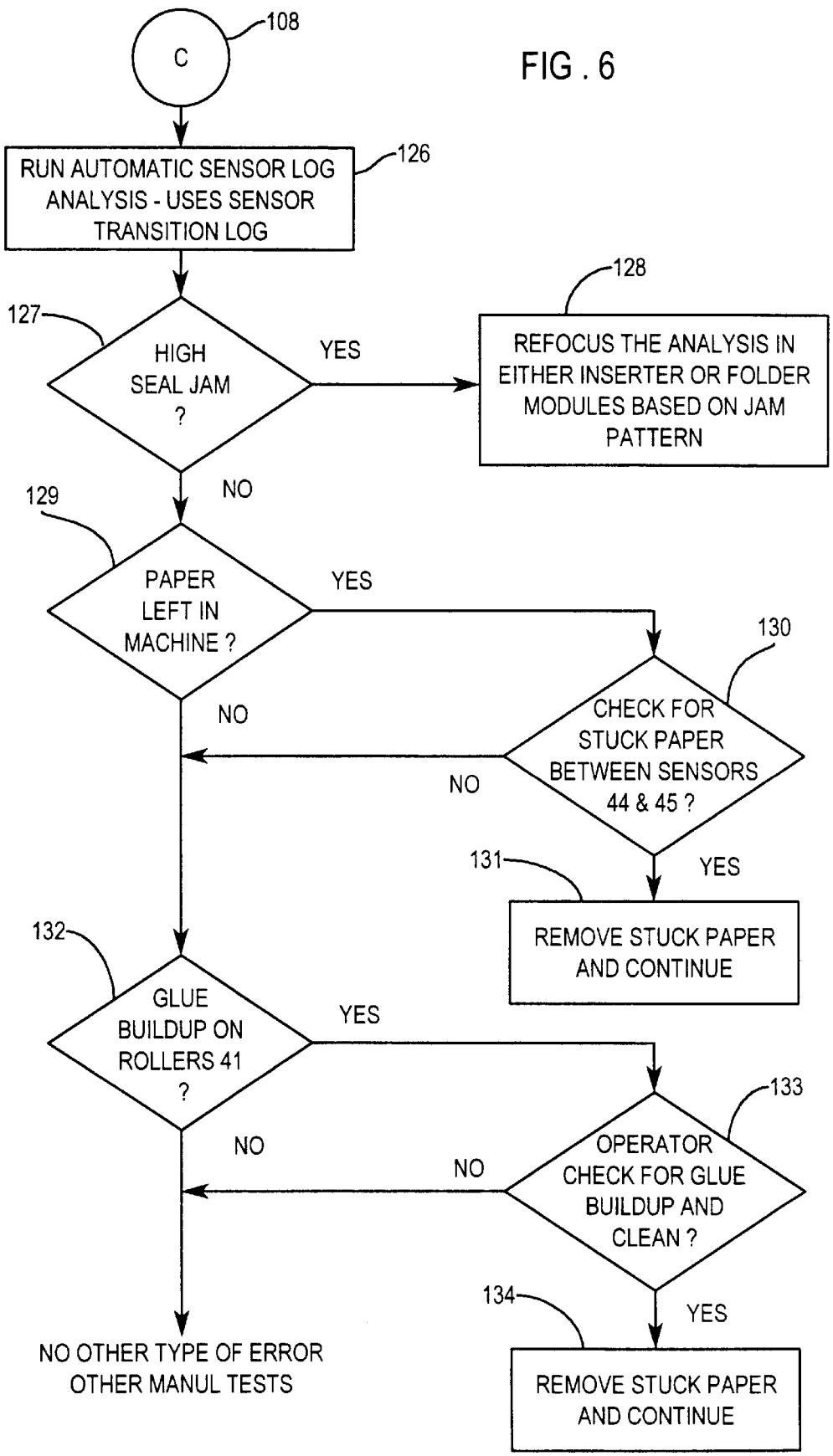
FIG. 6 is a flowchart of jams between sensor 44 and sensor 45, i.e., sub-routine C.

FIG. 6 is a flowchart of jams between Sensor 44 and Sensor 45. Sub-routine C begins in Block 108 and proceeds to Block 126 to automatically run Sensor Log Analysis, using the Sensor Transition Log. Then the program goes to Decision Block 127. Decision Block 127 determines whether or not there is a High Seal Jam that is causing a jam in another module upstream. This type of error pattern would not be detected by examining just one set of information. Additional information may be utilized, such as the mailpiece composition and how the mailpiece was folded to help confirm or deny specific fault modes. The Jam Log for combinations of jams in this and other modules upstream will be checked. If Block 127 determines that a High Seal jam is present (resulting from a partly folded or incompletely inserted envelope contents), then the program will go to Block 128 to refocus the analysis in another module, for instance, the Insert or Folder Modules, based on the observed jam patterns and other data. If Block 127 determines that no High Seal jam is present, then the program will proceed to Decision Block 129. Decision Block 129 determines whether or not paper was left in the machine. The Jam Log for Repetitive Jam Patterns in consecutive cycles will be checked. If Block 129 determines that paper was left in the machine, then the program will go Decision Block 130. Decision Block 130 determines whether or not the operator has checked for stuck paper between Entrance Sensor 44 and Exit Sensor 45. If Block 130 determines that paper is stuck between Entry Sensor 44 and Exit Sensor 45, then the program will go to Block 131 to inform the operator to remove the stuck paper and continue. Thus, a service call would be avoided. If Block 130 determines that no paper is stuck between Sensors 44 and 45, then program will proceed to the No Output of Decision Block 129. If Decision Block 129 determines that no paper is left in the machine, then the program will proceed to Decision Block 132. Decision Block 132 postulates whether or not there is a glue build-up on Rollers 41 by asking for operator visual confirmation. If Block 132 determines that there is a glue build-up on Rollers 41, then the program will proceed to Decision Block 133. Decision Block 133 determines whether or not the operator checked for the glue build-up on Rollers 41 and cleaned Rollers 41. If Block 133 determines that there is a glue build-up, then the program goes to Block 134 and informs the technician or operator to remove the stuck paper and continue. If Block 133 determines that there is no glue build-up on Rollers 21, then the program proceeds to the No Output of Block 132. If Block 132 determines that the glue build-up on rollers 41 does not exist, then the program goes to the No Output of Block 132. The No Output of Block 132 goes to other manual tests.

Figure 7:
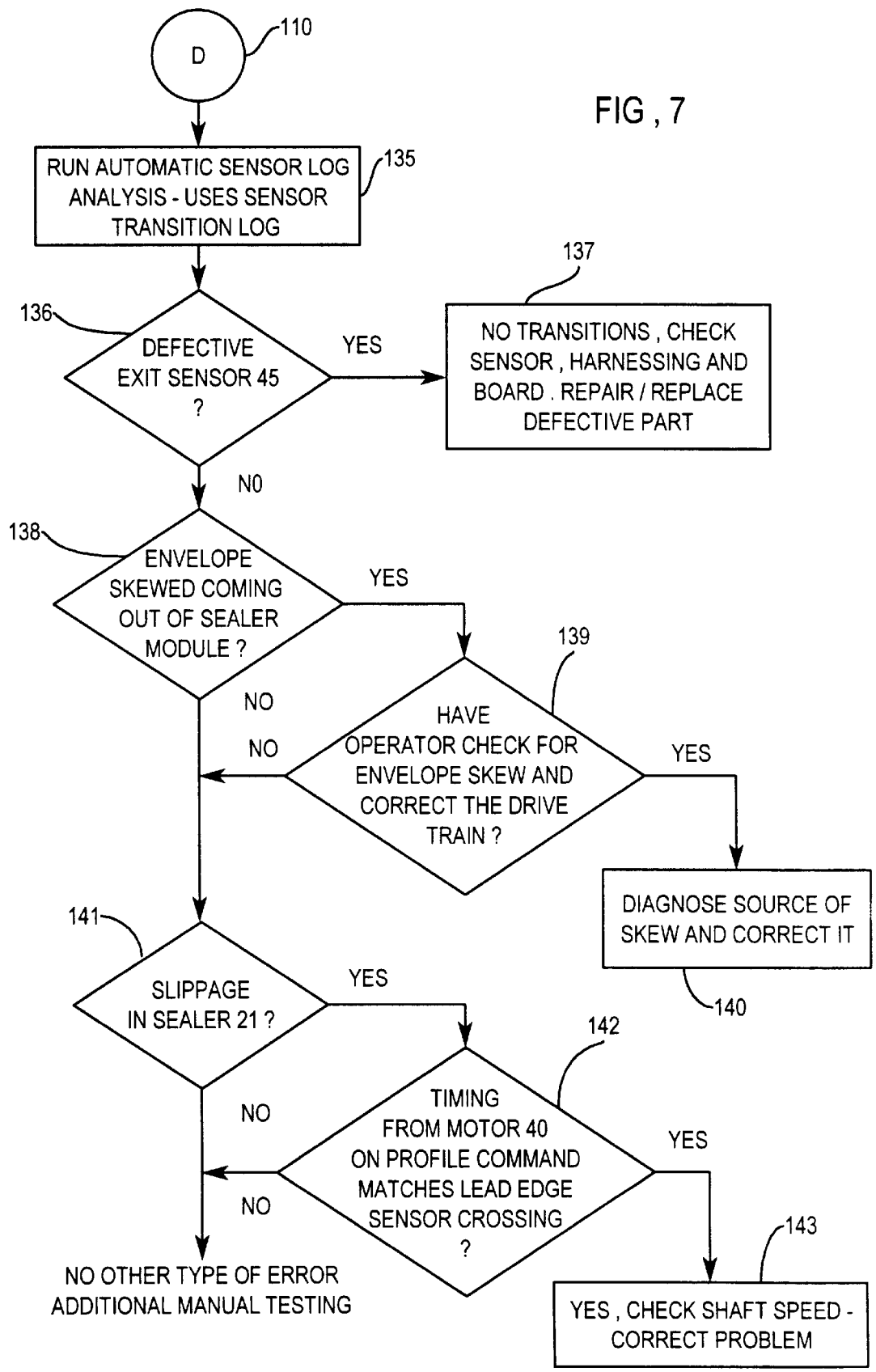
FIG. 7 is a flowchart of jams under exit sensor 45, i.e., sub-routine D.

FIG. 7 is a flowchart of jams under Exit Sensor 45. Sub-routine D begins in Block 110 and then proceeds to Block 135 to automatically run the Sensor Log analysis using the Sensor Transition Log. Then the program proceeds to Decision Block 136. Decision Block 136 determines whether or not Exit Sensor 45 is defective. The foregoing is accomplished by checking the Sensor Log for trail edge transitions on Sensor 45. If Block 136 determines that Sensor 45 is defective, that is, no transitions have appeared on the log, then the operator is informed to check Sensor 45, the harnessing and board and, if necessary, to have the technician replace the defective part. If Block 136 determines that Exit Sensor 45 is not defective, then the program proceeds to Decision Block 138. Decision Block 138 determines whether or not an envelope is skewed coming out of Sealer Module 21. If Block 138 determines that an envelope is skewed coming out of Module 21, then the program proceeds to Decision Block 139. Decision Block 139 determines whether or not the service technician has checked for an envelope skew and corrected the drive train. If Block 139 determines that the operator has checked for the skew, and if the envelope is skewed, Block 140 postulates specific causes of skew (not shown) and asks for manual confirmation. A service technician is informed the operator to correct it. If Block 139 determines that no skew is present, then the program goes to the No Output of Block 138. If Block 138 determines that the envelope is not skewed coming out of Module 21, then the program proceeds to Decision Block 141. Decision Block 141 determines whether or not there is a slippage in Sealer 21. This is determined by checking the Profile History and Sensor Logs. If Block 141 determines that there is a slippage in Sealer 21, then the program proceeds to Decision Block 142. Decision Block 142 determines whether or not the timing from Motor 40 on a profile command matches the lead edge sensor crossing of Sensor 45 and compares this against a template. If Block 142 determines that the profile of Motor 40 matches the sensor crossing, then the program proceeds to Block 143 to inform the operator to check the shaft speed and correct the problem. If Block 144 determines that there is no timing mismatch or no slippage, then the program goes back to the No Output of Block 141. If Block 141 determines that there is no slippage in Sealer 21, then the program goes to an other type of error, additional manual testing.

The above specification describes a new and improved system for determining the current condition of various components of machines and equipment without having a representative of the manufacturer physically inspect the customers machines and equipment for many faults and then inspect for specific faults if a service call is required. It is realized that the above description may indicate to those skilled in the art additional ways in which the principles of this invention may be used without departing from the spirit. It is, therefore, intended that this invention be limited only by the scope of the appended claims.

What is claimed is:

1. A diagnostic system that analyzes the operation and maintenance of operating systems that utilize sensors to determine the location of objects within the operating system and motion controllers to operate the mechanisms of the operating system, said system comprises:

a) means for recording all sensor transitions in a log;

b) means for recording all profile state execution histories of the motion controllers; and c) means for cross referencing the sensor transitions and the profile state execution histories to determine timing margins between the sensors and the actions of the motion controllers that are not apparent in the sensor transitions or profile state execution histories taken by themselves, to determine specific types of errors wherein knowledge pertaining to the sensor transitions profile state execution histories and job histories is centralized in a diagnostic analyzer that provides error isolation so that a specific repair action of the operating system may be recommended.

2. The diagnostic system claimed in claim 1, wherein the sensor transitions represent the response of the object to the stimulus provided by the motion controllers.

3. The diagnostic system claimed in claim 1, further including:

means for obtaining a detailed job history that describes how the objects of the system are to be constructed.

4. The diagnostic system claimed in claim 3, wherein the information pertaining to the job history is combined with the sensor transistions and profile execution history to more accurately focus upon a specific cause of an error.

5. The diagnostic system claimed in claim 1, wherein the sensor transitions are stored in a first log and the profile state execution histories are stored in a second log.

6. The diagnostic system claimed in claim 1, wherein the diagnostic system is at a site remote from the operating system.

* * * * *